No. 683,937. Patented Oct. 8, 1901.
W. T. HODGSON & O. F. BLOOD.
FLY TRAP.
(Application filed Jan. 16, 1901.)
(No Model.)
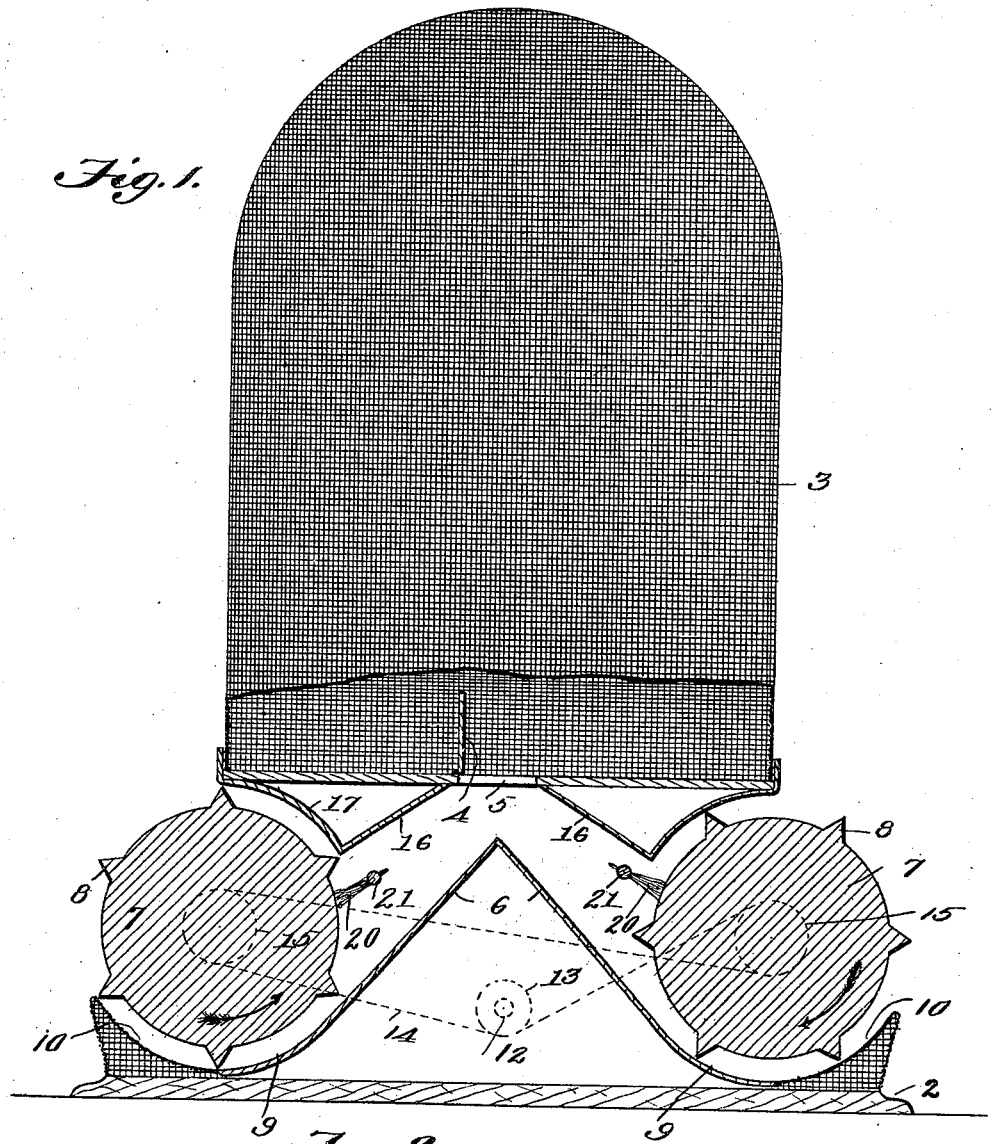
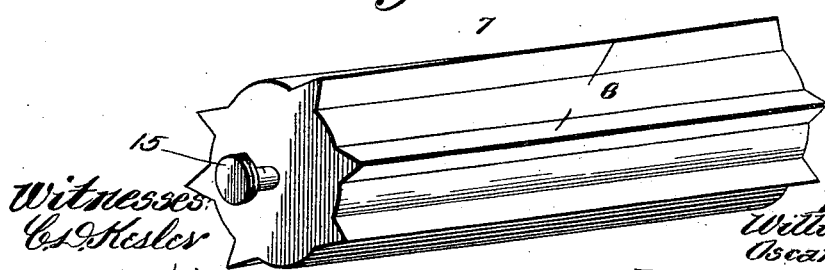

UNITED STATES PATENT OFFICE.

WILLIAM T. HODGSON AND OSCAR F. BLOOD, OF HULL, IOWA.

FLY-TRAP.

SPECIFICATION forming part of Letters Patent No. 683,937, dated October 8, 1901.

Application filed January 16, 1901. Serial No. 43,515. (No model.)

*To all whom it may concern:*

Be it known that we, WILLIAM T. HODGSON and OSCAR F. BLOOD, citizens of the United States, residing at Hull, in the county of Sioux and State of Iowa, have invented new and useful Improvements in Fly-Traps, of which the following is a specification.

This invention relates to fly-traps; and the object of the invention is to provide a simple and efficient device of this character adapted to capture and imprison flies, the trap including in its construction a removable cage which, when sufficient flies are caught therein, can be removed and dipped in hot water or otherwise disposed of for the purpose of killing the ensnared flies.

The trap includes in its organization dark and light chambers communicating with each other and means for positively carrying or leading the flies into the dark chamber from which they can crawl or fly into the light chamber, the latter being in the nature of a removable cage. In the present instance we provide a rotary roll to cause the flies to enter the dark chamber, the roll having elongated ribs on its periphery to preclude backward movement of the flies, and to secure the best result two of these rolls are provided, they being positively and oppositely driven to attain the desired object. Naturally when the flies enter the dark chamber they are confused and the only apparent egress open is the light chamber, for which they rapidly make, with the result that they are ensnared, and to attract the flies to these rotary rolls they may be coated with sweetened water or something of this nature.

The invention is shown in one simple embodiment thereof in the accompanying drawings, wherein—

Figure 1 is a transverse central section of the trap. Fig. 2 is a perspective view of one of the rotary rolls.

The trap includes a box, as 2, which may be of any desired material, shape, and size, and it is adapted to contain the movable parts of the device, the cage or trap proper 3 resting on the top of the box, so that it can be easily and quickly removed and placed in position. The bottom of the cage has a hinged door 4, adapted to cover the opening 5, and which is closed when the cage is removed, so as to prevent their escape. With the door shut the cage can be dipped into hot water. The cage can be made of light wire-netting, and it may be slipped over its base-piece to remove the dead flies.

There is arranged in the box 2 an inverted-V-shaped member 6, the apex of which is situated in alinement with the transverse median line of the opening 5, and the sides of this V-shaped member constitute part of the dark chamber into which the flies are carried.

The flies are carried into the trap by rolls, as 7, the shafts of which are journaled in the sides of the box 2, and these rolls have elongated wedge-shaped ribs or ridges 8 on their peripheries spaced at equidistant intervals, the part 6 being arranged midway between the rolls and the latter being located at the open front and rear sides of the box. The lower ends of the inclined sides of the part 6 terminate adjacent the faces of the rolls, and said sides terminate in segmental or curved portions 9, adapted to partially surround the respective rolls. The part 6 with the curved extension may be made in one or more pieces, as found most convenient, and tin is a suitable article from which the same can be made. The extreme outer ends of the curved extensions or bases 9 are overlapped or joined to the curved pieces 10, these latter being formed of netting, so as to admit light at the places where the flies are first entrapped. The width of the curved portions equals the distance between the ribs 8 on the rollers, so that after the flies have fairly entered the trap they are prevented by said ribs from returning, it being understood, of course, that the outer edges of said ribs travel in close proximity to the curved portions 9 and 10. The space below the V-shaped plate 6 is adapted to contain a spring-motor (not shown) for actuating the two rolls in unison. We have shown, however, the motor-shaft 12, it being suitably journaled in the side pieces of the box 2 and carrying a pulley 13, adapted to receive the crossed belt or band 14, passing around the pulleys 15 upon the shafts of the rolls 7. Of course other means may be adopted for positively driving the two rolls.

We have shown two inclined plates 16 arranged above the inclined sides of the part 6, said parts forming entries to the cage 3. These plates incline away from the opening 5, and they may have the curved portions 17 at their lower ends and are, like the part 6, conveniently and cheaply made from tin. The curved portions 17 of the inclined plates 16 extend upward and around the peripheries of the rolls and aid in excluding light from the dark chamber. The inner surfaces of the parts 6 and 16 should be painted some dark color, so as to form dark chambers, it being understood they are imperforate.

The direction of rotation of the simultaneously movable rolls is indicated by arrows in Fig. 1, and the surfaces of the rolls having been coated with sweetened water or some other bait the flies will be drawn thereto, and as the rolls operate the flies will be carried into the dark chambers of the box, consisting of the imperforate plates 6 and 16. As they enter these chambers they become confused and naturally fly to the cage 3, which is light, wherein they are entrapped.

The trap hereinbefore described is light and simple and thoroughly efficient for the purpose intended. Besides this it can be manufactured at a low cost.

The dark chambers in the box 2 contain brushes, as 20, which are adapted to come in contact with the rotating rolls 7, this purpose being to arouse the flies and dislodge them from said rolls and cause them to creep or fly to the trap 3. These brushes 20 are secured to pins, as 21, secured between the walls of the casing.

Having described the invention, we claim—

1. In a trap, a box, a cage carried by said box having an opening, rolls supported in the box, an inverted-V-shaped plate in the box between the rolls, and inclined plates located over the inclined sides of said V-shaped plate and leading to said opening.

2. In a trap, a box, a cage carried by the box having an opening, rolls sustained by the box, having peripheral ridges; an inverted-V-shaped plate in the box between the rolls, the lower ends of the sides of the plate being curved around the rolls, and inclined plates located above said inclined sides and leading to said opening.

3. In a trap, a box, a cage supported by said box, having an opening, rolls journaled in the box having peripheral ridges, an inverted-V-shaped plate in the box, the lower ends of the sides being curved around the rolls, curved reticulated pieces connected to said curved ends, and extending outward therefrom, inclined plates located above said V-shaped plate and leading to said opening, and means for positively rotating the rolls in opposite directions.

4. In a trap, a box, a cage carried by said box, having an opening, rolls supported in the box, an inverted-V-shaped plate in the box between the rolls, inclined plates located over the inclined side of said V-shaped plate, and brushes to engage the peripheries of the rolls.

In testimony whereof we have hereunto set our hands in presence of two subscribing witnesses.

WILLIAM T. HODGSON.
OSCAR F. BLOOD.

Witnesses:
E. H. BRUNER,
E. H. REIMANN.